United States Patent
Ge (10) Patent No.: US 9,243,537 B1
(45) Date of Patent: Jan. 26, 2016

(54) EXHAUST AFTERTREATMENT SYSTEM FOR AN INTERNAL COMBUSTION ENGINE AND METHOD FOR OPERATING SAME

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/488,830

(22) Filed: Sep. 17, 2014

(51) Int. Cl.
*F01N 3/00* (2006.01)
*F01N 3/20* (2006.01)
*F01N 13/00* (2010.01)

(52) U.S. Cl.
CPC .............. *F01N 3/206* (2013.01); *F01N 13/009* (2014.06); *F01N 2610/02* (2013.01)

(58) Field of Classification Search
USPC ........... 60/274, 286, 287, 288, 289, 292, 295, 60/297, 303, 324
See application file for complete search history.

(56) References Cited

U.S. PATENT DOCUMENTS

| | | | |
|---|---|---|---|
| 4,955,326 A | 9/1990 | Helmich | |
| 6,409,973 B1 * | 6/2002 | Kinugasa | B01D 53/9481 422/171 |
| 6,968,680 B2 * | 11/2005 | van Nieuwstadt | F01N 3/0842 60/274 |
| 7,571,602 B2 * | 8/2009 | Koch | F01N 3/0807 48/197 R |
| 7,640,731 B2 * | 1/2010 | Huang | F01N 3/031 60/274 |
| 7,661,263 B2 | 2/2010 | Coleman et al. | |
| 7,954,313 B2 * | 6/2011 | Hirata | B01D 53/944 60/286 |
| 8,281,572 B2 | 10/2012 | Chi et al. | |
| 8,412,439 B2 | 4/2013 | Warner et al. | |
| 8,652,410 B2 | 2/2014 | Nordberg et al. | |
| 2005/0223699 A1 | 10/2005 | Ancimer et al. | |
| 2009/0308060 A1 * | 12/2009 | Suzuki | B01D 46/0058 60/311 |
| 2012/0167558 A1 | 7/2012 | Svihla et al. | |
| 2012/0222400 A1 | 9/2012 | Walker et al. | |
| 2013/0269323 A1 | 10/2013 | Oguri et al. | |
| 2014/0130481 A1 | 5/2014 | Eager et al. | |

FOREIGN PATENT DOCUMENTS

| WO | 2013030548 A1 | 3/2011 |
|---|---|---|
| WO | 2011041576 A2 | 4/2011 |

* cited by examiner

*Primary Examiner* — Binh Q Tran
(74) *Attorney, Agent, or Firm* — Baker & Hostetler LLP (57) ABSTRACT

An exhaust aftertreatment system for an engine includes an exhaust valve assembly having a first port, a second port, and a third port, the exhaust valve assembly being configured to effect selective fluid communication between the first port, the second port, and the third port; an exhaust conduit fluidly coupled to an exhaust port of the engine and fluidly coupled to the first port of the exhaust valve assembly; an exhaust aftertreatment device fluidly coupled to the second port of the exhaust valve assembly; a bypass conduit fluidly coupled to the third port of the exhaust valve assembly, the bypass conduit configured to bypass a flow of exhaust around the exhaust aftertreatment device; a reductant supply in selective fluid communication with the exhaust conduit; and a controller operatively coupled to the exhaust valve assembly and the reductant supply.

20 Claims, 9 Drawing Sheets

EXHAUST AFTERTREATMENT SYSTEM FOR AN INTERNAL COMBUSTION ENGINE AND METHOD FOR OPERATING SAME

TECHNICAL FIELD

This patent disclosure relates generally to internal combustion engines and, more particularly, to exhaust aftertreatment systems and methods for internal combustion engines.

BACKGROUND

Reciprocating internal combustion (IC) engines are known for converting chemical energy stored in a fuel supply into mechanical shaft power. A fuel-oxidizer mixture is received in a variable volume of an IC engine defined by a piston translating within a cylinder bore. The fuel-oxidizer mixture burns inside the variable volume to convert chemical energy in the mixture into heat. In turn, expansion of the combustion products within the variable volume performs work on the piston, which may be transferred to an output shaft of the IC engine.

Some constituents in the exhaust stream from an IC engine, such as, for example, nitrogen oxides (NOx), unburned hydrocarbons (UHCs), and particulate matter (PM), may be subject to government regulations. Accordingly, operators may wish to control concentrations of regulated exhaust constituents discharged to the environment. The composition of exhaust discharged from an IC engine may be affected by control of the combustion process within the variable volume combustion chamber, exhaust aftertreatment downstream of the combustion chamber, or combinations thereof. Exhaust aftertreatment devices such as selective catalytic reduction (SCR) catalysts, oxidation catalysts, particulate filters, three-way catalysts, and NOx adsorbers are known for trapping and/or converting exhaust constituents to control the composition of exhaust discharged to the environment from an IC engine.

U.S. Pat. No. 7,661,263 (the '263 patent), entitled "Method of Operating an Internal Combustion Engine," describes a method for operating an internal combustion engine in more than one combustion mode. An exhaust system of the '263 patent may include a NOx adsorber and a bypass path that enables the exhaust stream to be routed around the NOx adsorber. According to the '263 patent, the exhaust stream may avoid the NOx adsorber via the bypass path when the engine operates in a first combustion mode, and the exhaust stream may be directed into contact with the NOx adsorber when the engine operates in a mode other than the first combustion mode. Further according to the '263 patent, the NOx adsorber may be regenerated by running the engine in a rich condition.

However, apparatus and methods are desired for regenerating a NOx adsorber independent of engine operating conditions. Accordingly, the present disclosure addresses the aforementioned concern and/or other problems in the art.

SUMMARY

According to an aspect of the disclosure, an exhaust aftertreatment system for an engine comprises an exhaust valve assembly having a first port, a second port, and a third port, the exhaust valve assembly being configured to effect selective fluid communication between the first port, the second port, and the third port; an exhaust conduit fluidly coupled to an exhaust port of the engine and fluidly coupled to the first port of the exhaust valve assembly; an exhaust aftertreatment device fluidly coupled to the second port of the exhaust valve assembly; a bypass conduit fluidly coupled to the third port of the exhaust valve assembly, the bypass conduit configured to bypass a flow of exhaust around the exhaust aftertreatment device; a reductant supply in selective fluid communication with the exhaust conduit; and a controller operatively coupled to the exhaust valve assembly, the reductant supply, and the engine. The controller is configured to regenerate the exhaust aftertreatment device according to a first regeneration procedure when the engine operates in a substantially non-premixed mode, the first regeneration procedure including delivering a flow of reductant from the reductant supply to the exhaust conduit, effecting fluid communication between the first port and the second port, and blocking fluid communication between the first port and the third port.

Another aspect of the disclosure provides a method for operating an exhaust gas aftertreatment system for an engine. The exhaust gas aftertreatment system includes an exhaust valve assembly having a first port, a second port, and a third port, the exhaust valve assembly being configured to effect selective fluid communication between the first port, the second port, and the third port; an exhaust conduit fluidly coupled to an exhaust port of the engine and fluidly coupled to the first port of the exhaust valve assembly; a exhaust aftertreatment device fluidly coupled to the second port of the exhaust valve assembly; a bypass conduit fluidly coupled to the third port of the exhaust valve assembly, the bypass conduit configured to bypass a flow of exhaust around the exhaust aftertreatment device; and a reductant supply in selective fluid communication with the exhaust conduit. The method comprises receiving a flow of exhaust gas at the first port of an exhaust valve assembly; operating the engine in a substantially non-premixed mode; and regenerating the exhaust aftertreatment device while the engine operates in the substantially non-premixed mode according to a first regeneration procedure, including delivering a flow of reductant from the reductant supply to the exhaust aftertreatment device, effecting fluid communication between the first port and the second port, and blocking fluid communication between the first port and the third port.

According to another aspect of the disclosure, an article of manufacture comprises non-transitory machine-readable instructions encoded thereon for enabling a processor to perform the operations of generating a flow of exhaust gas from an engine; operating the engine in a substantially non-premixed combustion mode; and regenerating an exhaust aftertreatment device while the engine operates in the substantially non-premixed combustion mode by delivering a first flow of reductant from a reductant supply to the flow of exhaust gas, and configuring an exhaust valve assembly to effect fluid communication between the flow of exhaust gas and the exhaust aftertreatment device, and block fluid communication between the flow of exhaust gas and a bypass duct configured to bypass the exhaust aftertreatment device.

According to another aspect of the disclosure, an exhaust aftertreatment system comprises a first housing; a second housing in fluid communication with the first housing via a crossover duct; an upstream aftertreatment device disposed in the first housing; an exhaust valve assembly disposed downstream of the upstream aftertreatment device and upstream of the crossover duct in a direction of exhaust flow through the exhaust aftertreatment system; a downstream aftertreatment device disposed in the second housing; and a bypass duct in fluid communication with the exhaust valve assembly and an outlet of the second housing. The exhaust valve assembly includes a first port, a second port, and a third port. The first port is fluidly coupled with an outlet of the upstream aftertreatment device, and the second port is fluidly coupled with the second housing via the crossover duct. A first configuration of the exhaust valve assembly effects fluid communication between the first port and the second port, and blocks fluid communication between the first port and the third port, and a second configuration of the exhaust valve assembly blocks fluid communication between the first port and the second port, and effects fluid communication between the first port and the third port.

DETAILED DESCRIPTION

Aspects of the disclosure will now be described in detail with reference to the drawings, wherein like reference numbers refer to like elements throughout, unless specified otherwise.

Figure 1:
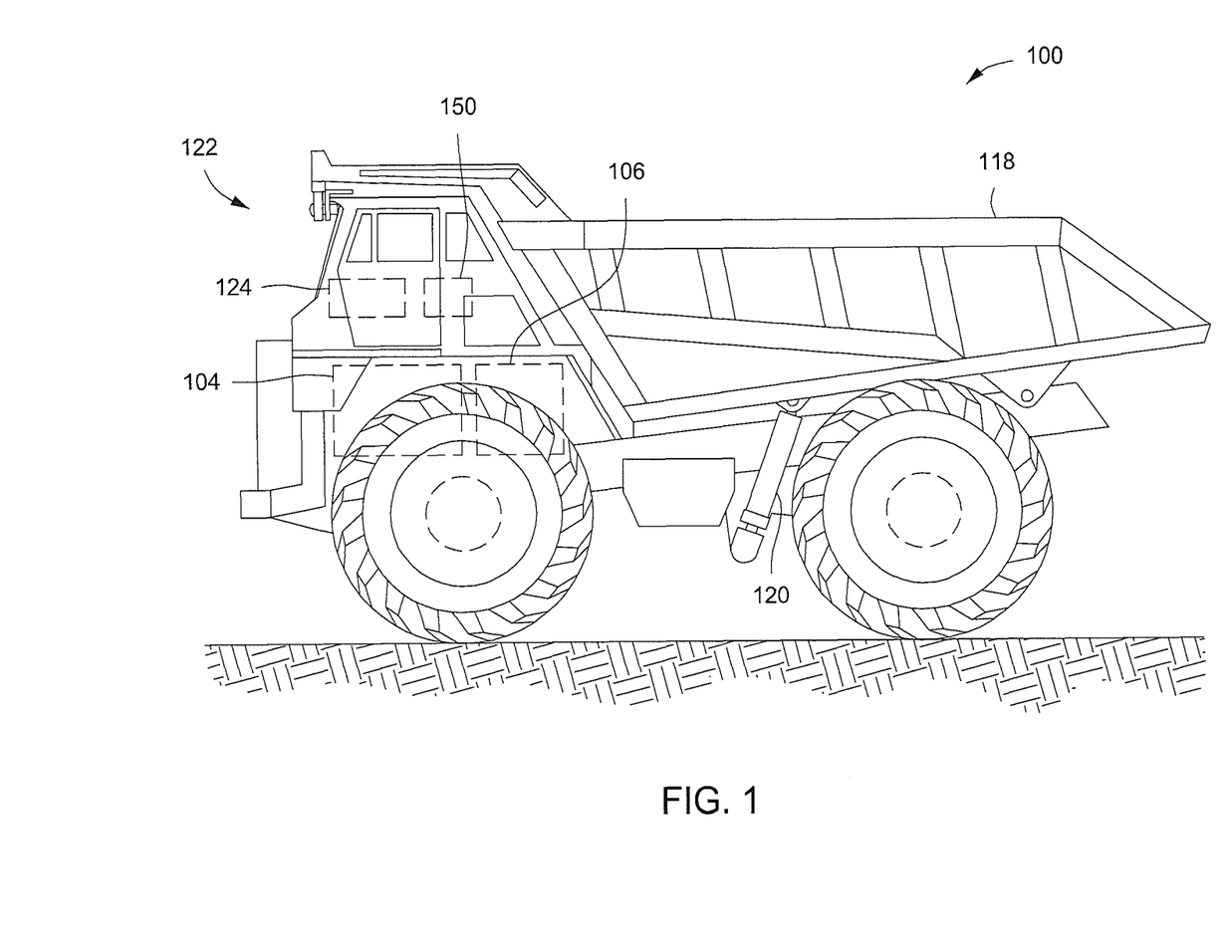
FIG. 1 shows a side view of a machine, according to an aspect of the disclosure.

FIG. 1 shows a side view of a machine 100, according to an aspect of the disclosure. The machine 100 is powered by an internal combustion (IC) engine 104 including an exhaust system 106. The IC engine 104 maybe a reciprocating internal combustion engine, such as a compression ignition engine or a spark ignition engine, for example, or a rotating internal combustion engine, such as a gas turbine, for example.

The machine 100 may also include a work implement 118 driven by an actuator 120. The work implement 118 could be a dump bed, a shovel, a drill, a fork lift, a feller buncher, a conveyor, or any other implement known in the art for performing work on a load. The actuator 120 may be a hydraulic actuator, such as a linear hydraulic actuator or a hydraulic motor, an electric motor, a pneumatic actuator, or any other actuator known in the art.

The machine may include a cab 122 configured to accommodate an operator, and have a user interface 124 including input devices for asserting control over the machine 100. The user interface 124 may include pedals, wheels, joysticks, buttons, touch screens, combinations thereof, or any other user input device known in the art. Alternatively or additionally, the user interface 124 may include provisions for receiving control inputs remotely from the cab 122, including wired or wireless telemetry, for example.

The machine 100 includes a controller 150 operatively coupled to the user interface 124 for effecting control actions based at least in part on inputs from the user interface 124. It will be appreciated that the controller 150 may also effect either open-loop or closed-loop control actions based on inputs from sensors, operating maps stored therein, combinations thereof, or any other control inputs known in the art.

The machine 100 can be an "over-the-road" vehicle such as a truck used in transportation or may be any other type of machine that performs some type of operation associated with an industry such as mining, construction, farming, transportation, or any other industry known in the art. For example, the machine may be an off-highway truck, a railway locomotive, earth-moving machine, such as a wheel loader, excavator, dump truck, backhoe, motor grader, material handler, or the like. The term "machine" can also refer to stationary equipment like a generator that is driven by an internal combustion engine to generate electricity. The specific machine 100 illustrated in FIG. 1 is a dump truck having a dump bed 118 actuated by a linear hydraulic cylinder 120.

Figure 2:
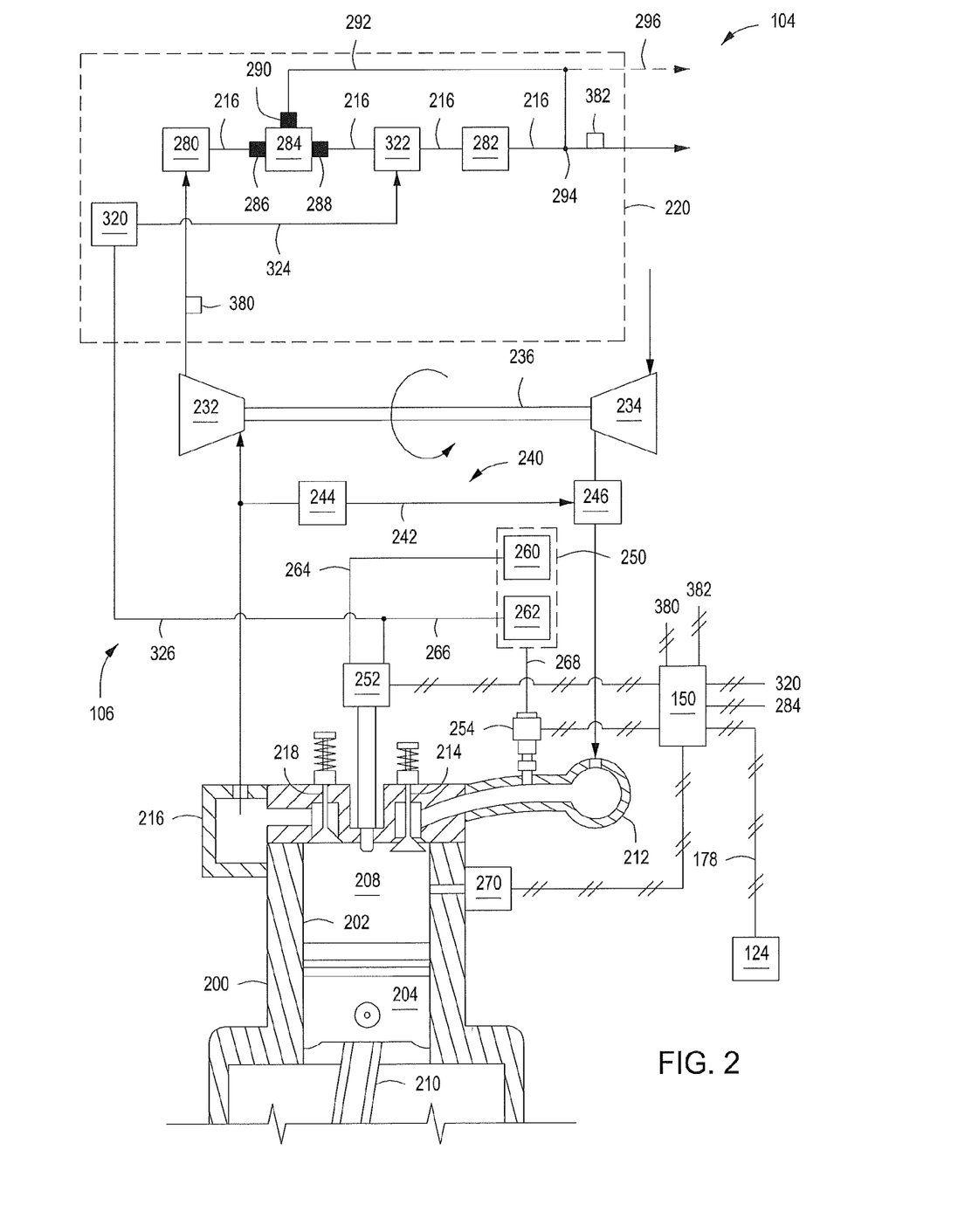
FIG. 2 shows a schematic view of an IC engine, according to an aspect of the disclosure.

FIG. 2 shows a schematic view of an IC engine 104, according to an aspect of the disclosure. The IC engine 104 includes a block 200 defining at least one cylinder bore 202 therein, at least one piston 204 disposed in sliding engagement with the cylinder bore 202, and a head 206 disposed on the block 200. The cylinder bore 202, the piston 204, and the head 206 define a combustion chamber 208. A volume of the combustion chamber 208 may vary with the location of the piston 204 relative to the head 206, such that the volume of the combustion chamber 208 is at a maximum when the piston 204 is located at Bottom Dead Center (BDC) of its stroke, and the volume of the combustion chamber 208 is at a minimum when the piston 204 is located at Top Dead Center (TDC) of its stroke.

The IC engine 104 may operate according to a four-stroke cycle, including an intake stroke (TDC to BDC), a compression stroke (BDC to TDC), an expansion stroke (TDC to BDC), and an exhaust stroke (BDC to TDC). Alternatively, the IC engine 104 may operate according to a two-stroke cycle, including a compression/exhaust stroke (BDC to TDC) and an expansion/exhaust/intake stroke (TDC to BDC).

The piston 204 is pivotally connected to a crankshaft (not shown) via a connecting rod 210 for transmitting mechanical power therebetween. Although only one piston 204 and cylinder bore 202 are shown in FIG. 2, it will be appreciated that the IC engine 104 may be configured to include any number of pistons and cylinder bores to suit a particular design or application.

The IC engine 104 receives a flow of oxidizer from an intake duct 212. One or more intake valves 214 effect selective fluid communication between the intake duct 212 and the combustion chamber 208. The IC engine 104 discharges a flow of exhaust to the exhaust system 106 via an exhaust duct 216. One or more exhaust valves 218 effect selective fluid communication between the combustion chamber 208 and the exhaust duct 216. The intake valves 214 and the exhaust valves 218 may be actuated by a cam/push-rod/rocker arm assembly (not shown), a solenoid actuator, a hydraulic actuator, or by any other cylinder valve actuator known in the art to open or close intake or exhaust valves.

The exhaust system 106 includes an exhaust aftertreatment system 220 for trapping exhaust constituents, converting an exhaust constituent from one composition to another composition, or both. The exhaust aftertreatment system 220 may include a particulate filter, a nitrogen oxide (NOx) conversion module, an oxidation catalyst, an acoustic muffler, combinations thereof, or any other exhaust aftertreatment device known in the art. Oxidation catalysts may be tailored to target oxidation of specific species, including hydrocarbons, ammonia, or combinations thereof, for example. According to an aspect of the disclosure, the IC engine 104 does not include a particulate filter. According to another aspect of the disclosure, the IC engine 104 does not include an ammonia oxidation catalyst.

The exhaust aftertreatment system 220 may include an upstream aftertreatment device 280, a downstream aftertreatment device 282, and an exhaust valve assembly 284. The upstream aftertreatment device may include a particulate filter, a NOx conversion module, an oxidation catalyst, combinations thereof, or any other exhaust aftertreatment device known in the art. Likewise, the downstream aftertreatment device 282 may include a particulate filter, a NOx conversion module, an oxidation catalyst, combinations thereof, or any other exhaust aftertreatment device known in the art. According to an aspect of the disclosure, the upstream aftertreatment device 280 is a diesel oxidation catalyst and the downstream aftertreatment device 282 is a NOx conversion module. According to another aspect of the disclosure, the downstream aftertreatment device 282 is a NOx adsorber.

As used herein, the term "NOx adsorber" means any structure, technology, or system capable of storing NOx, including NO, NO2, or both, through adsorption, and capable of promoting conversion of the stored NOx into nitrogen in the presence of a reducing agent and sufficient temperature. Further, unless specified otherwise, the term "NOx adsorber" is intended herein to be synonymous with "NOx trap," "lean NOx trap," "DeNOx trap," and "NOx storage/reduction catalysts." The NOx adsorber may include a zeolite, or other material suitable for adsorbing NOx, and a catalyst that promotes conversion of the stored NOx into nitrogen in the presence of a reducing agent such as a hydrocarbon, carbon monoxide, or hydrogen.

According to another aspect of the disclosure, the downstream aftertreatment device includes a selective catalytic reduction (SCR) catalyst capable of promoting the conversion of NOx into nitrogen in the presence of a reductant such as ammonia, without substantial adsorption of NOx in the SCR catalyst material.

The exhaust valve assembly 284 is configured to effect selective fluid communication between at least three ports, namely a first port 286, a second port 288, and a third port 290. According to an aspect of the disclosure, the exhaust valve assembly has a first configuration that effects fluid communication between the first port 286 and the second port 288, and blocks fluid communication between the first port 286 and the third port 290. According to another aspect of the disclosure, the exhaust valve assembly 284 has a second configuration that blocks fluid communication between the first port 286 and the second port 288, and effects fluid communication between the first port 286 and the third port 290. According to yet another aspect of the disclosure, the exhaust valve assembly 284 has a third configuration that effects fluid communication between the first port 286 and both of the second port 288 and the third port 290. The third configuration may be proportionally controlled to continuously vary a flow split between the first port 286 and the second port 288 and the third port 290. The exhaust valve assembly 284 may be operatively coupled to the controller 150, such that the controller 150 may actuate the exhaust valve assembly 284 between its first configuration, its second configuration, and a third configuration between the first configuration and the second configuration.

The first port 286 of the exhaust valve assembly 284 is in fluid communication with the upstream aftertreatment device 280 via the exhaust duct 216, and the second port 288 of the exhaust valve assembly 284 is in fluid communication with the downstream aftertreatment device 282 via the exhaust duct 216. The third port 290 of the exhaust valve assembly 284 is in fluid communication with an ambient environment of the IC engine 104 via a bypass duct 292. The bypass duct 292 may be in fluid communication with the ambient environment of the IC engine 104 via recombination with the exhaust duct 216 at a point 294 downstream of the downstream aftertreatment device 282, or through a conduit 296 that is separate from the exhaust duct 216.

Figure 3:
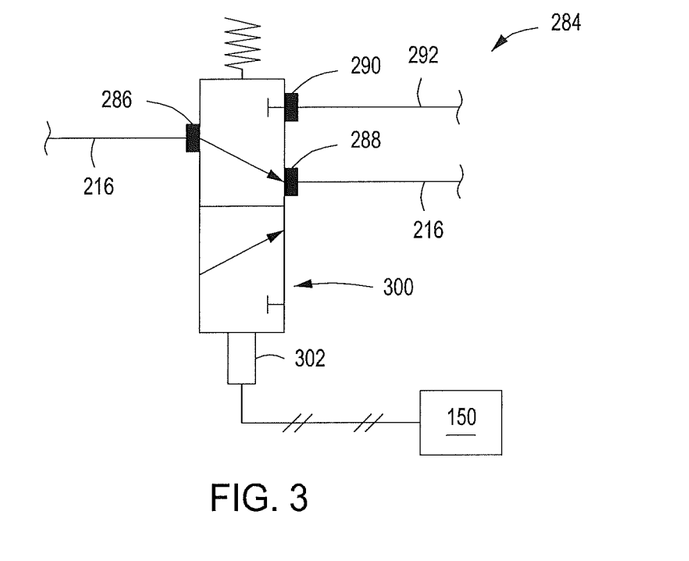
FIG. 3 shows a schematic view of an exhaust valve assembly, according to an aspect of the disclosure.
Figure 4:
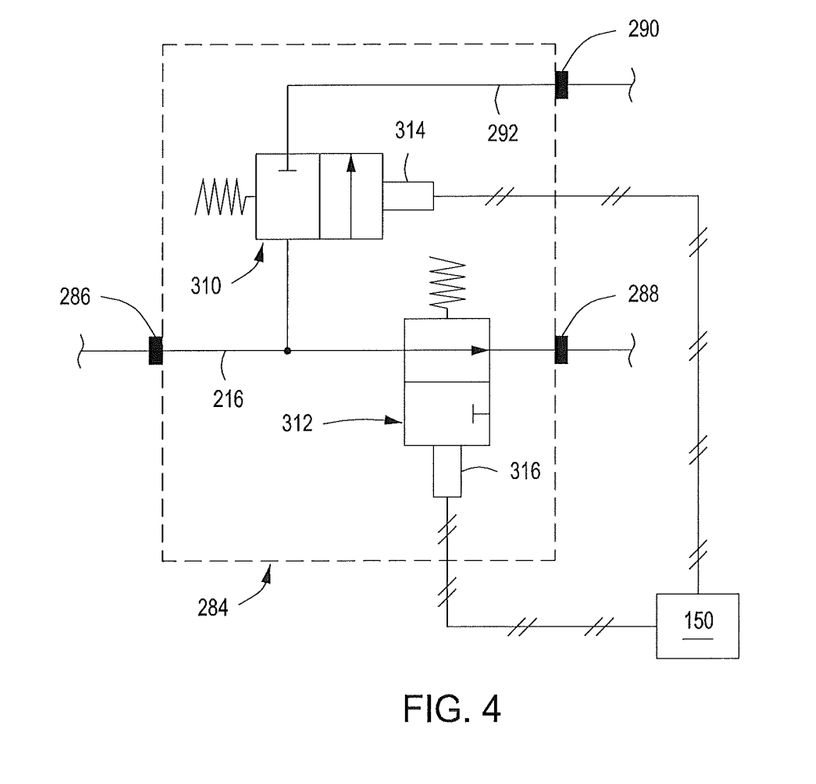
FIG. 4 shows a schematic view of an exhaust valve assembly, according to an aspect of the disclosure.

It will be appreciated that the exhaust valve assembly 284 may include damper elements, ball valve elements, gate valve elements, or any other valve elements known in the art. According to an aspect of the disclosure, the exhaust valve assembly is a three-port, two-position valve 300, having a single actuator 302 as shown in FIG. 3. According to another aspect of the disclosure, the exhaust valve assembly 284 includes two distinct two-port, two-position valves 310, 312 having distinct actuators 314, 316, as shown in FIG. 4, where actuation of the valves 310, 312 is coordinated by the controller 150 to effect the first configuration and the second configuration of the exhaust valve assembly 284. However, it will be appreciated that other structures capable of effecting the first configuration and the second configuration of the exhaust valve assembly 284 are within the scope of the present disclosure.

Returning to FIG. 2, the IC engine 104 may include a turbocharger 230 having a turbine 232 operably coupled to a compressor 234 via a shaft 236. The turbine 232 receives a flow of exhaust gas via the exhaust duct 216 and extracts mechanical work from the exhaust gas by expansion of the exhaust gas therethrough. The mechanical work extracted from the turbine 232 from the flow of exhaust gas is transmitted to the compressor 234 via the shaft 236. The compressor 234 receives a flow of oxidizer, such as, for example, ambient air, and performs work on the flow of oxidizer by compression thereof. The flow of compressed oxidizer is discharged from the compressor 234 into the intake duct 212.

Additionally, the IC engine 104 may include an Exhaust Gas Recirculation (EGR) loop 240 for conveying exhaust gas into the oxidizer flow. The EGR loop 240 may include an EGR conduit 242 in fluid communication with the exhaust duct 216 upstream of the turbine 232, and in fluid communication with the intake duct 212 downstream of the compressor 234, effecting a so-called "high-pressure EGR loop." The EGR conduit 242 may incorporate an EGR conditioning module 244 that effects cooling, filtering, or throttling of exhaust gases flowing therethrough, combinations thereof, or any other exhaust gas processing known to benefit the operation of the EGR loop 240. The EGR conduit 242 may fluidly couple with the intake duct 212 at a mixing device 246 configured to effect mixing between the recirculated exhaust gas and the flow of oxidizer.

The IC engine 104 receives combustible fuel from a fuel supply system 250. The fuel supply system 250 may include fuel storage, compressors, pumps, valves, regulators, instrumentation, or any other elements known in the art to be useful for supplying a flow of fuel. The IC engine 104 includes a direct fuel injector 252 disposed in direct fluid communication with the combustion chamber 208, a port fuel injector 254 disposed in fluid communication with the intake duct 212 upstream of the intake valve 214, combinations thereof, or any other fuel injector arrangement known in the art. The direct fuel injector 252 and the port fuel injector 254 may each be operatively coupled to the controller 150 for control thereof.

The fuel supply system 250 may include a first fuel supply 260, a second fuel supply 262, or both. The direct fuel injector 252 may be in fluid communication with the first fuel supply 260 via a first fuel conduit 264, the second fuel supply 262 via a second fuel conduit 266, or both. The port fuel injector may be in fluid communication with the second fuel supply 262 via a third fuel conduit 268.

According to an aspect of the disclosure, the first fuel supply 260 is a liquid fuel supply that delivers a liquid fuel to the combustion chamber 208. The liquid fuel may include distillate diesel, biodiesel, dimethyl ether, ethanol, methanol, seed oils, liquefied natural gas (LNG), liquefied petroleum gas (LPG), Fischer-Tropsch derived fuel, combinations thereof, or any other combustible liquid known in the art to have a sufficiently high octane value and a sufficiently low cetane value to enable compression ignition in a reciprocating IC engine. According to another aspect of the disclosure, the first fuel supply 260 is a distillate diesel fuel supply.

According to an aspect of the disclosure, the second fuel supply 262 is a gaseous fuel supply that delivers a gaseous fuel to the combustion chamber 208. The gaseous fuel may include natural gas, methane, propane, hydrogen, biogas, syngas, combinations thereof, or any other combustible gas known in the art. According to another aspect of the disclosure, the gaseous fuel is natural gas. According to yet another aspect of the disclosure, the gaseous fuel is a combustible gas comprising at least 50% methane by mole.

The direct fuel injector 252 is configured to effect selective fluid communication between the fuel supply system 250 and the combustion chamber 208. For example, the direct fuel injector may assume any one of the following four fluid configurations. According to a first configuration, the direct fuel injector 252 blocks fluid communication between both the first fuel supply 260 and the second fuel supply 262, and the combustion chamber 208. According to a second configuration, the direct fuel injector 252 blocks fluid communication between the first fuel supply 260 and the combustion chamber 208 and effects fluid communication between the second fuel supply 262 and the combustion chamber 208. According to a third configuration, the direct fuel injector 252 effects fluid communication between the first fuel supply 260 and the combustion chamber 208 and blocks fluid communication between the second fuel supply 262 and the combustion chamber 208. According to a fourth configuration, the direct fuel injector 252 effects fluid communication between both the first fuel supply 260 and the second fuel supply, and the combustion chamber 208.

The direct fuel injector 252 may include an actuator configured to change the fluid configuration of the direct fuel injector 252 under the control of the controller 150. The actuator for the direct fuel injector 252 may include a solenoid actuator, a hydraulic actuator, a pneumatic actuator, a mechanical actuator, such as, for example a cam actuator, combinations thereof, or any other fuel injector actuator known in the art.

Similarly, the port fuel injector 254 is configured to effect selective fluid communication between the fuel supply system 250 and the combustion chamber 208. For example, the port fuel injector 254 may assume one of the following two fluid configurations. According to a first configuration, the port fuel injector 254 blocks fluid communication between the second fuel supply 262 and the intake duct 212. According to a second configuration, the port fuel injector 254 effects fluid communication between the second fuel supply 262 and the intake duct.

The port fuel injector 254 may include an actuator configured to change the fluid configuration of the port fuel injector 254 under the control of the controller 150. The actuator for the port fuel injector 254 may include a solenoid actuator, a hydraulic actuator, a pneumatic actuator, a mechanical actuator, such as, for example a cam actuator, combinations thereof, or any other fuel injector actuator known in the art.

The exhaust aftertreatment system 220 includes a regeneration module 320 in fluid communication with the exhaust duct 216. According to an aspect of the disclosure, the regeneration module 320 couples to the exhaust duct 216 at a mixing device 322 via a duct 324. The mixing device 322 is configured to mix a fluid supplied by the regeneration module 320 through the duct 324 and a flow of engine exhaust through the exhaust duct 216.

The regeneration module 320 may include a reformer for converting a hydrocarbon fuel into a reducing agent with a composition that causes or promotes conversion of NOx to nitrogen through the downstream aftertreatment device 282. According to an aspect of the disclosure, the regeneration module 320 includes a reformer configured to generate hydrogen from a feed stock containing methane according to the following chemical reactions:

$$CH_4 + 2O_2 \rightarrow 4H_2 + 2CO \quad \text{Equation (1)}$$

$$CH_4 + H_2O \rightarrow CO + 3H_2 \quad \text{Equation (2)}$$

$$CO + H_2O \rightarrow CO_2 + H_2 \quad \text{Equation (3)}$$

The regeneration module may receive a hydrocarbon fuel from the fuel supply system 250, and in particular, a gaseous fuel containing methane from the second fuel supply 262. According to an aspect of the disclosure, the regeneration module 320 is in fluid communication with the second fuel supply 262 via a regeneration fuel supply conduit 326. However, it will be appreciated that reducing agents other than hydrogen, such as, hydrocarbons or CO derived from a liquid or gaseous fuel stream, may be generated by the regeneration module 320 and used to regenerate the downstream aftertreatment device 282.

Alternatively or additionally, the regeneration module 320 may store and deliver a reductant for regenerating an SCR catalyst, such as for example, urea or ammonia, into a flow of exhaust through the exhaust duct 216 The regeneration module 320 may include storage tanks, pumps, compressors, valves, actuators, instrumentation, or any other structures known to benefit regeneration of the downstream aftertreatment module. Further, the regeneration module 320 may be operatively coupled to the controller 150 for control thereof.

The controller 150 may effect regeneration of the downstream aftertreatment device 282, in several ways. According to an aspect of the disclosure, regeneration of the downstream aftertreatment device 282 is accomplished at least in part by delivering a flow of reductant from the regeneration module 320 to the downstream aftertreatment device 282, effecting fluid communication between the first port 286 and the second port 288 of the exhaust valve assembly 284, and blocking fluid communication between the first port 286 and the third port 290 of the exhaust valve assembly 284. According to another aspect of the disclosure, regeneration of the downstream aftertreatment device 282 is accomplished at least in part by delivering a flow of reductant from the regeneration module 320 to the downstream aftertreatment device 282, blocking fluid communication between the first port 286 and the second port 288 of the exhaust valve assembly 284, and effecting fluid communication between the first port 286 and the third port 290 of the exhaust valve assembly 284.

According to yet another aspect of the disclosure, regeneration of the downstream aftertreatment device 282 is accomplished at least in part by delivering a flow of reductant from the regeneration module 320 to the downstream aftertreatment device 282, and effecting fluid communication between the first port 286 and both the second port 288 and the third port 290 of the exhaust valve assembly 284, such that a flow of exhaust entering the first port 286 is split between the second port 288 and the third port 290. Accordingly, the exhaust valve assembly 284 may be configured to achieve a desired flow split between the bypass duct 292 and the downstream aftertreatment device 282. The desired flow split may be selected to achieve a target temperature in the downstream aftertreatment device 282, maintain a constituent of the mixture entering the downstream aftertreatment device 282 below a lean flammability limit, maintain a target gas velocity through the downstream aftertreatment device 282, maintain a target pressure drop across the exhaust aftertreatment system 220, combinations thereof, or any other metric known in the art to be relevant to operating an exhaust aftertreatment system.

The exhaust aftertreatment system 220 may also include species concentration sensors 380, 382 in fluid communication with the exhaust flow from the IC engine 104, and in operative communication with the controller 150. As shown in FIG. 2, the species concentration sensor 380 may be disposed downstream of the turbine 232 and upstream of the upstream aftertreatment device 280. Further, as shown in FIG. 2, the species concentration sensor 382 may be disposed downstream of both the downstream aftertreatment device 282 and the bypass duct 292. Accordingly, the controller 150 may use inputs from the species concentration sensors 380, 382 to better control or optimize operation of the exhaust aftertreatment system 220. According to an aspect of the disclosure, the species concentration sensors 380, 382 are NOx concentration sensors.

The controller 150 may use measurements from the species concentration sensors 380, 382, for example, to track NOx storage capacity of a NOx adsorber composing a part of the downstream aftertreatment device 282. In turn, the controller 150 may determine when a NOx adsorber would benefit from regeneration by calculations based on NOx storage capacity therein. According to an aspect of the disclosure, the controller 150 triggers a regeneration of the a NOx adsorber when a NOx storage within the NOx adsorber exceeds a threshold storage value for the NOx adsorber.

The controller 150 may be in data communication with the user interface 124 via a data connection 178 for receiving control inputs from a user of the machine 100. Further, the controller 150 may be in data communication with the IC engine 104 via one or more data connections for receiving sensor signals from the IC engine 104, delivering control inputs to the IC engine 104, combinations thereof, or for transmitting any data known in the art to be relevant to operation of the IC engine 104. It will be appreciated that any data connections between the controller 150 and any other element of the IC engine 104 may include wired connections, wireless connections, combinations thereof, or any other data communication means known in the art.

The controller 150 may be any purpose-built processor for effecting control of the machine 100. It will be appreciated that the controller 150 may be embodied in a single housing, or a plurality of housings distributed throughout the machine 100. Further, the controller 150 may include power electronics, preprogrammed logic circuits, data processing circuits, volatile memory, non-volatile memory, software, firmware, combinations thereof, or any other controller structures known in the art.

Figure 5:
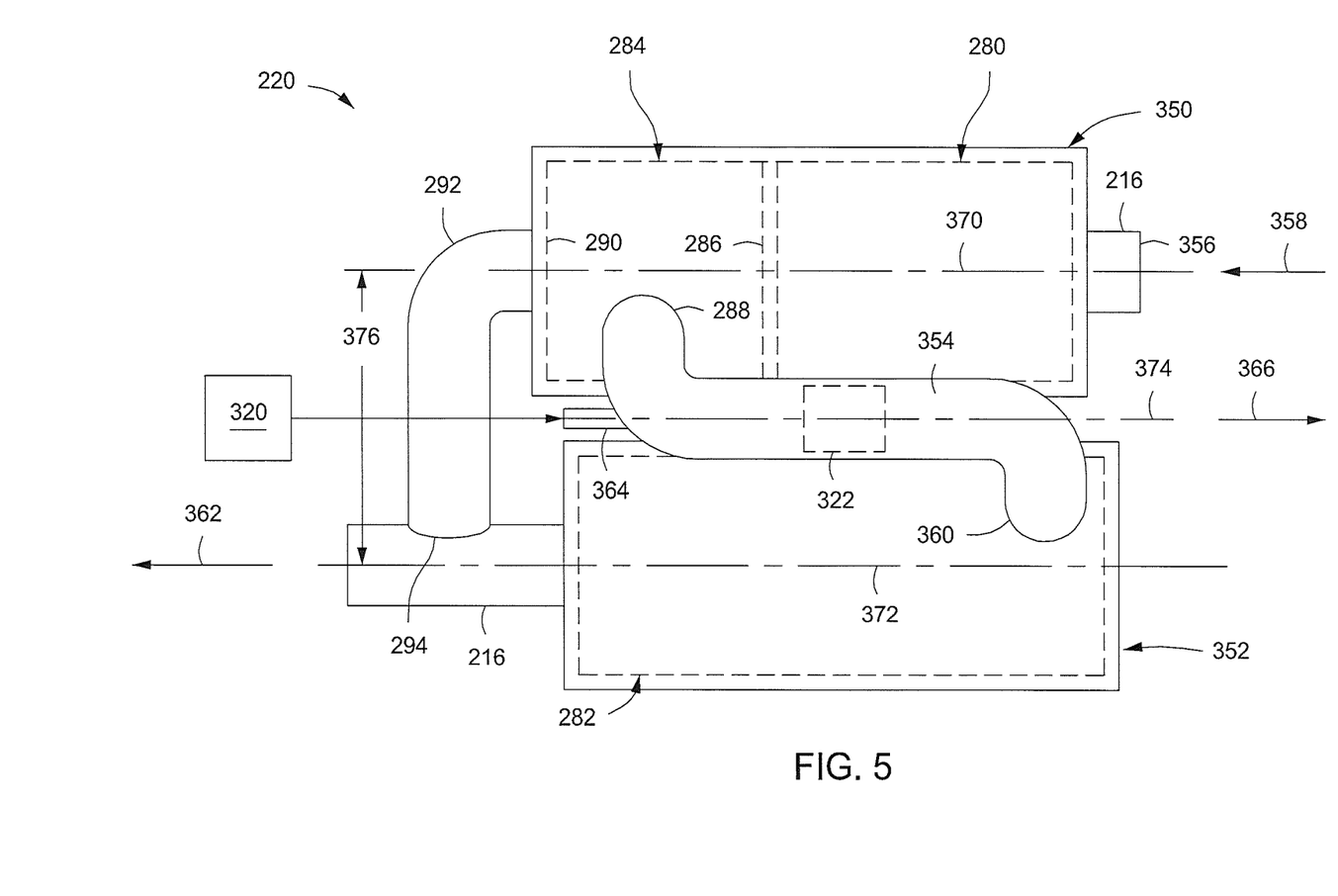
FIG. 5 shows a top schematic view of an exhaust aftertreatment system, according to an aspect of the disclosure.

FIG. 5 shows a top schematic view of an exhaust aftertreatment system 220, according to an aspect of the disclosure. The exhaust aftertreatment system 220 includes a first housing 350, a second housing 352, and a crossover duct 354. An inlet 356 of the first housing 350 composes at least a portion of the exhaust duct 216 (see FIG. 2), and receives exhaust gas therefrom. The upstream aftertreatment device 280 is disposed within the first housing 350. The exhaust valve assembly 284 is in fluid communication with the upstream aftertreatment device 280, and may be disposed inside or outside the first housing 350. The upstream aftertreatment device 280 is disposed upstream of the exhaust valve assembly 284 along a direction of exhaust flow 358.

The first port 286 is defined by a flow passage between the outlet of the upstream aftertreatment device 280 and the inlet to exhaust valve assembly 284 along the direction of exhaust flow 358. In the particular aspect illustrated in FIG. 5, the third port 290 of the exhaust valve assembly 284 is in fluid communication with the exhaust duct 216 at a point 294 downstream of the second housing 352 along an exhaust flow direction 362.

The crossover duct 354 effects fluid communication between the second port 288 of the exhaust valve assembly 284 and the inlet 360 to the second housing 352. The downstream aftertreatment device 282 is disposed within the second housing 352. An injector 364 may be disposed on the crossover duct 354 and effect fluid communication between the regeneration module 320 and the crossover duct 354. The crossover duct 354 may contain or compose at least a part of a mixing device 322, for mixing a fluid injected by the injector 364 and exhaust flow through the exhaust aftertreatment system 220. According to an aspect of the disclosure, the mixing device 322 consists of the crossover duct 354. The injector 364 may be disposed proximate to the second port 288 of the exhaust valve assembly 284 to better maximize a mixing length between the injector 364 and the inlet 360 along the exhaust flow direction 366.

The first housing 350 and the second housing 352 may each have a generalized cylindrical cross section transverse to the exhaust flow direction therethrough, including, but not limited to, a circular cylinder, an ellipse, a polygon, or any other duct cross section known in the art. A longitudinal axis 370 of the first housing 350 may be parallel to a longitudinal axis 372 of the second housing 352, such that the longitudinal axis 370 and the longitudinal axis 372 lie in a common plane. The longitudinal axis 370 may be spaced apart from the longitudinal axis 372 by a distance 376. A longitudinal axis 374 of the crossover duct 354 may be parallel to the longitudinal axis 370, the longitudinal axis 372, or both.

INDUSTRIAL APPLICABILITY

The present disclosure is generally applicable to exhaust aftertreatment systems and methods for internal combustion engines.

Referring to FIG. 2, the controller 150 is configured to operate the IC engine 104 in different operating modes. According to an aspect of the disclosure, the controller 150 is configured to operate the IC engine 104 in a substantially premixed combustion mode or a substantially non-premixed combustion mode. Non-limiting examples of substantially premixed modes of operation include homogeneous charge compression ignition (HCCI) and piloted-HCCI. A non-limiting example of a non-premixed combustion mode is conventional direct-injection compression ignition.

The conventional direct-injection compression ignition mode is characterized by most, if not all, of the fuel being injected relatively late in the compression stroke, or relatively early in the expansion stroke, when the temperature and pressure in the combustion chamber are sufficient to autoignite mixtures of the fuel and oxidizer. The autoignition delay times are relatively short, and in turn, the start of combustion is largely determined by the fuel injection timing. According to an aspect of the disclosure, the conventional compression ignition mode is a diesel operating mode.

As a result of the short residence time of the fuel and oxidizer between the fuel injection and the start of combustion, the combustion process may proceed in a largely mixing-limited fashion, resulting in propagation of a substantially non-premixed or diffusion-type flame through the fuel-oxidizer mixture in the combustion chamber. In turn, much of the fuel may burn at a near-stoichiometric mixture at a boundary between fuel rich regions and adjacent oxidizer, resulting in high flame temperatures and relatively rapid formation of nitrogen oxides (NOx) and particulate matter. According to an aspect of the disclosure for the conventional compression ignition mode, most, if not all, of the fuel is injected between about 40 degrees before TDC of the compression stroke and about 20 degrees after TDC of the compression stroke.

Figure 6:
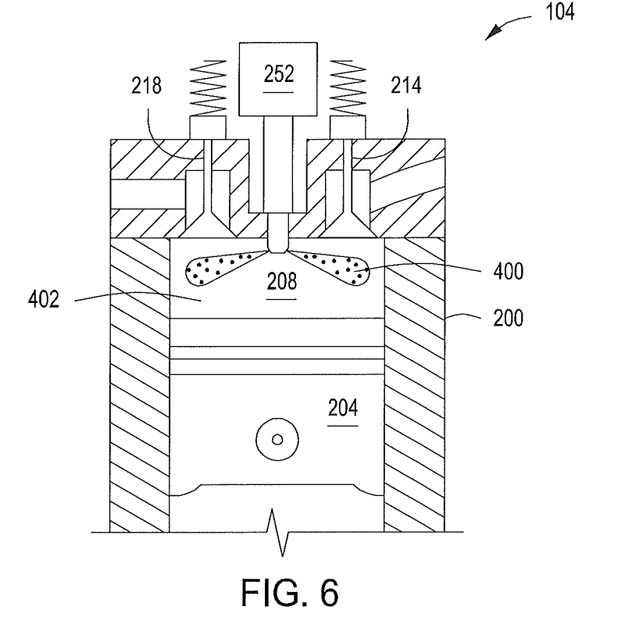
FIG. 6 shows a schematic cross sectional view of an IC engine operating in a conventional compression ignition mode, according to an aspect of the disclosure.

For example, FIG. 6 shows a schematic cross sectional view of an IC engine 104 operating in a conventional compression ignition mode, according to an aspect of the disclosure. In FIG. 6, the piston 204 is near TDC of the compression stroke, which may include piston locations before or after TDC of the compression stroke, pressure and temperature in the combustion chamber 208 are sufficient to effect autoignition, and the exhaust valve 218 and intake valve 214 are in closed positions. The direct fuel injector 252 injects a portion of high octane and/or low cetane fuel 400 into a mass of compressed oxidizer 402. After an ignition delay time, corresponding to factors including pressure and temperature in the combustion chamber 208, chemical composition of the oxidizer, and chemical composition of the injected fuel 400, the portion of fuel 400 burns in the mass of compressed oxidizer 402 in a largely mixing-limited fashion.

The HCCI mode is characterized by most, if not all, of the fuel being injected relatively early in the compression stroke, or even during the preceding intake stroke, when the temperature and pressure in the combustion chamber are insufficient to autoignite mixtures of the fuel and oxidizer. Accordingly, the fuel and oxidizer enjoy a relatively long time duration, and charge motion caused by the motion of the piston in the cylinder bore, to thoroughly evaporate and form a lean, substantially homogeneous mixture of fuel and oxidizer. According to an aspect of the disclosure, a lean and substantially homogeneous mixture of fuel and oxidizer is devoid of mixture portions having a rich stoichiometry at the start of combustion.

The start of combustion during the HCCI mode is then determined by when the temperature and pressure in the combustion chamber reach conditions sufficient to support autoignition of the lean fuel-oxidizer mixture. As a result of the premixed nature of the fuel and oxidizer and the autoignition conditions present at the start of combustion, the combustion process proceeds rapidly over the volume of the combustion chamber with little or no discernable flame propagation. In turn, much if not all of the fuel burns at a lean equivalence ratio, which results in low flame temperatures and slow formation of NOx and particulates. According to an aspect of the disclosure for the HCCI mode, most, if not all, of the fuel is introduced into the combustion chamber before about 40 degrees before TDC. During the HCCI mode fuel may be introduced into the combustion chamber 208 via the direct fuel injector 252, the port fuel injector 254, or combinations thereof.

Figure 7:
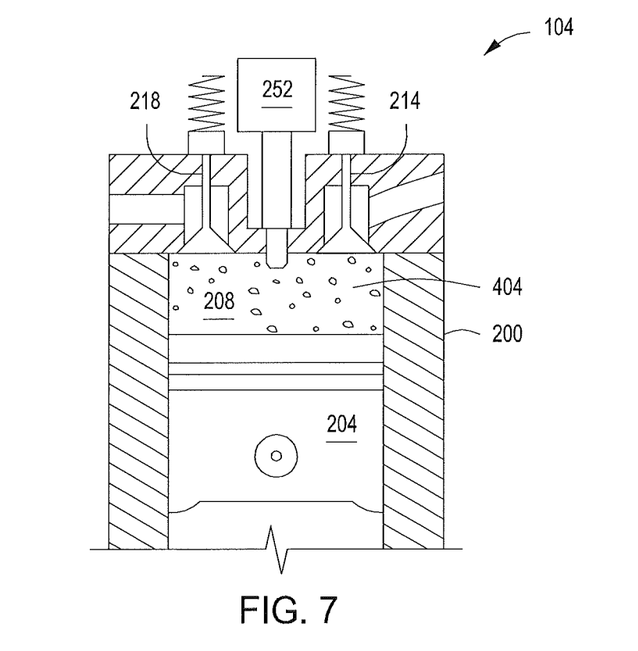
FIG. 7 shows a schematic cross sectional view of an IC engine operating in an HCCI mode, according to an aspect of the disclosure.

For example, FIG. 7 shows a schematic cross sectional view of an IC engine 104 operating in an HCCI mode, according to an aspect of the disclosure. In FIG. 7, the piston 204 is before TDC of the compression stroke, pressure and temperature in the combustion chamber 208 are still insufficient to effect autoignition of a lean fuel-oxidizer mixture, and the exhaust valve 218 and intake valve 214 are in closed positions. Prior to the timing shown in FIG. 7, a portion of fuel was introduced into the combustion chamber 208 by the direct fuel injector 252, the port fuel injector 254, or both, and the portion of fuel mixed with an oxidizer to form a nearly homogeneous fuel-oxidizer mixture 404 in the combustion chamber 208. The mixture 404 ignites after further compression, thereby increasing both the pressure and temperature of the mixture 404, and the mixture 404 burns in a largely premixed mode.

It will be appreciated that the stoichiometry of the fuel-oxidizer mixture 404 may be varied with factors including, but not limited to, the load of the IC engine 104 across a plurality of discreet and preselected HCCI operating conditions.

The piloted-HCCI mode is characterized by most of the fuel being injected relatively early in the compression stroke, similar to the HCCI mode, but then ignition timing is largely determined by a later and relatively smaller pilot injection of fuel near TDC of the compression stroke. Although the pressure and temperature in the combustion chamber may not be sufficient to autoignite the lean homogeneous mixture of fuel and oxidizer, the richer pilot injection autoignites after a short ignition delay time, thereby providing an ignition source to propagate a flame through the lean premixture of fuel and oxidizer. In turn, most of the fuel burns at a lean equivalence ratio, and therefore a low flame temperature and corresponding low formation rates of NOx and particulate matter, while the pilot injection improves control over the start of combustion. Alternatively or additional to the pilot fuel injection, the IC engine 104 may include a spark igniter (not shown) configured to ignite the lean homogeneous mixture of fuel and oxidizer by transmitting an electric spark through at least a portion of the lean fuel-oxidizer mixture.

According to an aspect of the disclosure for the piloted-HCCI mode, most of the fuel is introduced into the combustion chamber before about 40 degrees before TDC. According to another aspect of the disclosure for the piloted-HCCI mode, over 90% of the fuel, by heating value, is introduced into the combustion chamber before about 40 degrees before TDC, and less than about 10% of the remaining fuel is injected via a direct pilot injection after about 40 degrees before TDC. According to another aspect of the disclosure, the direct pilot injection contributes between about 4 to 7 percent of the total heat released in the combustion chamber. During the piloted-HCCI mode, most of the fuel may be introduced into the combustion chamber 208 via the direct fuel injector 252, the port fuel injector 254, or combinations thereof.

Figure 8:
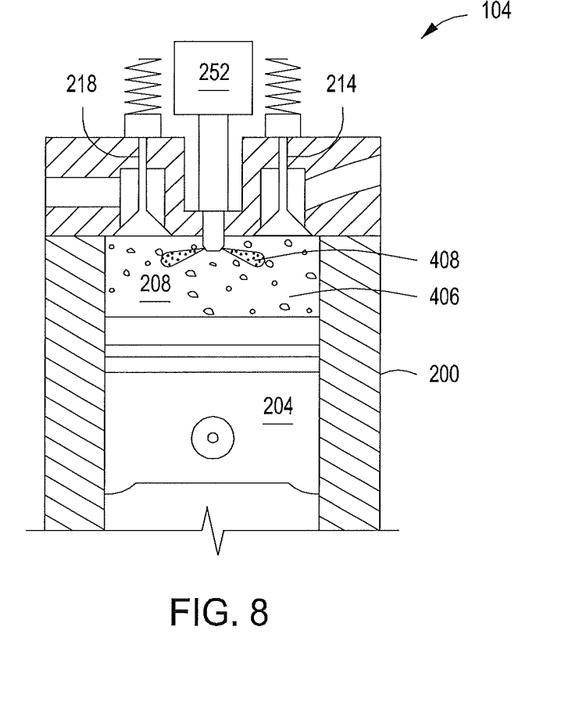
FIG. 8 shows a schematic cross sectional view of an IC engine operating in a piloted-HCCI mode, according to an aspect of the disclosure.

For example, FIG. 8 shows a schematic cross sectional view of an IC engine 104 operating in a piloted-HCCI mode, according to an aspect of the disclosure. In FIG. 8, the piston 204 is near TDC of the compression stroke, which may include piston locations before or after TDC of the compression stroke; pressure and temperature in the combustion chamber 208 are still insufficient to effect autoignition of a lean fuel-oxidizer mixture; and the exhaust valve 218 and intake valve 214 are in closed positions. Prior to the timing shown in FIG. 8, a portion of fuel was introduced into the combustion chamber 208 by the direct fuel injector 252, the port fuel injector 254, or both, and the portion of fuel mixed with an oxidizer to form a nearly homogeneous lean fuel-oxidizer mixture 406 in the combustion chamber 208. A second portion of fuel having a relatively high octane number and/or low cetane number 408 is injected into the combustion chamber 208 as a pilot fuel injection. Although the pressure and temperature in the combustion chamber 208 are insufficient to effect autoignition of the fuel-oxidizer mixture 406, conditions are sufficient to effect autoignition of the second portion of fuel 408 near the richer boundary with the lean fuel-oxidizer mixture 406. In turn, the second portion of fuel 408 proceeds to burn in a largely mixing-limited combustion mode, which acts as an ignition source to ignite the fuel-oxidizer mixture 406 in a largely premixed combustion mode.

During the HCCI mode, most, if not all of the fuel may be gaseous fuel from the second fuel supply 262. During the piloted-HCCI mode, most of the fuel may be gaseous fuel from the second fuel supply 262, while the pilot injection is a high octane and/or low cetane fuel supplied by the first fuel supply 260.

When operating an IC engine with natural gas as the main fuel, in either an HCCI combustion mode or a piloted-HCCI combustion mode, for example, NOx emissions and particulate matter (PM) emissions may be controlled below government regulated limits through in-cylinder emissions control techniques without NOx and PM aftertreatment. Such government regulated limits may be 0.40 g/kW-hr and 0.02 g/kW-hr of PM according to US Environmental Protection Agency (EPA) Tier IV regulations, for example. However, an IC engine operating in an HCCI or piloted-HCCI mode may still benefit from an exhaust aftertreatment device, such as an oxidation catalyst, to control carbon monoxide (CO) and unburned hydrocarbons (UHCs) below government regulated limits. For example, EPA Tier IV regulations limit combined non-methane UHCs and NOx emissions to less than 0.40 g/kW-hr. EPA Tier IV regulations limit CO to less than 3.5 g/kW-hr. European Stage IV standards have similar emissions limits for off-road IC engines.

When operating the IC engine 104 in the conventional compression ignition mode, in-cylinder control of PM, NOx, and CO and UHCs alone may not be practical to meet government limits for these emissions across a desired operating range of the IC engine. In turn, operation of an IC engine in a conventional compression ignition mode may benefit from exhaust aftertreatment to reduce PM, NOx, CO, UHCs emissions, or combinations thereof, such as, particulate filters, oxidation catalysts, NOx SCR catalysts, and NOx adsorbers, for example.

However, exhaust aftertreatment may not be required to meet emissions limits for all regulated emissions at all engine operating points in the conventional compression ignition mode. For example, operation of the IC engine 104 in a conventional compression ignition mode below a first threshold power level may be tuned to meet PM emissions limits without aftertreatment for PM, such as a particulate filter, given aftertreatment provisions for reducing NOx and UHCs. Thus, according to an aspect of the disclosure, the upstream aftertreatment device 280 includes an oxidation catalyst configured to oxidize CO and UHCs, and the downstream aftertreatment device 282 includes a NOx adsorber. According to another aspect of the disclosure, the upstream aftertreatment device 280 consists of an oxidation catalyst configured to oxidize CO and UHCs, the downstream aftertreatment device 282 consists of a NOx adsorber configured to trap and convert NOx to nitrogen, and the exhaust aftertreatment system 220 includes no PM filter. It will be appreciated that oxidation catalysts according to aspects of the disclosure may also be effective at oxidizing NO into $NO_2$, which may benefit overall conversion rates of NOx into nitrogen through some NOx aftertreatment devices, such as a NOx adsorber, for example.

According to another aspect of the disclosure, operation of the IC engine 104 in a conventional compression ignition model above a second threshold power, the second threshold power being greater than the first threshold power, may be tuned to meet PM emissions limits without aftertreatment for PM, such as a particulate filter, given aftertreatment provisions for reducing NOx and UHCs.

Figure 9:
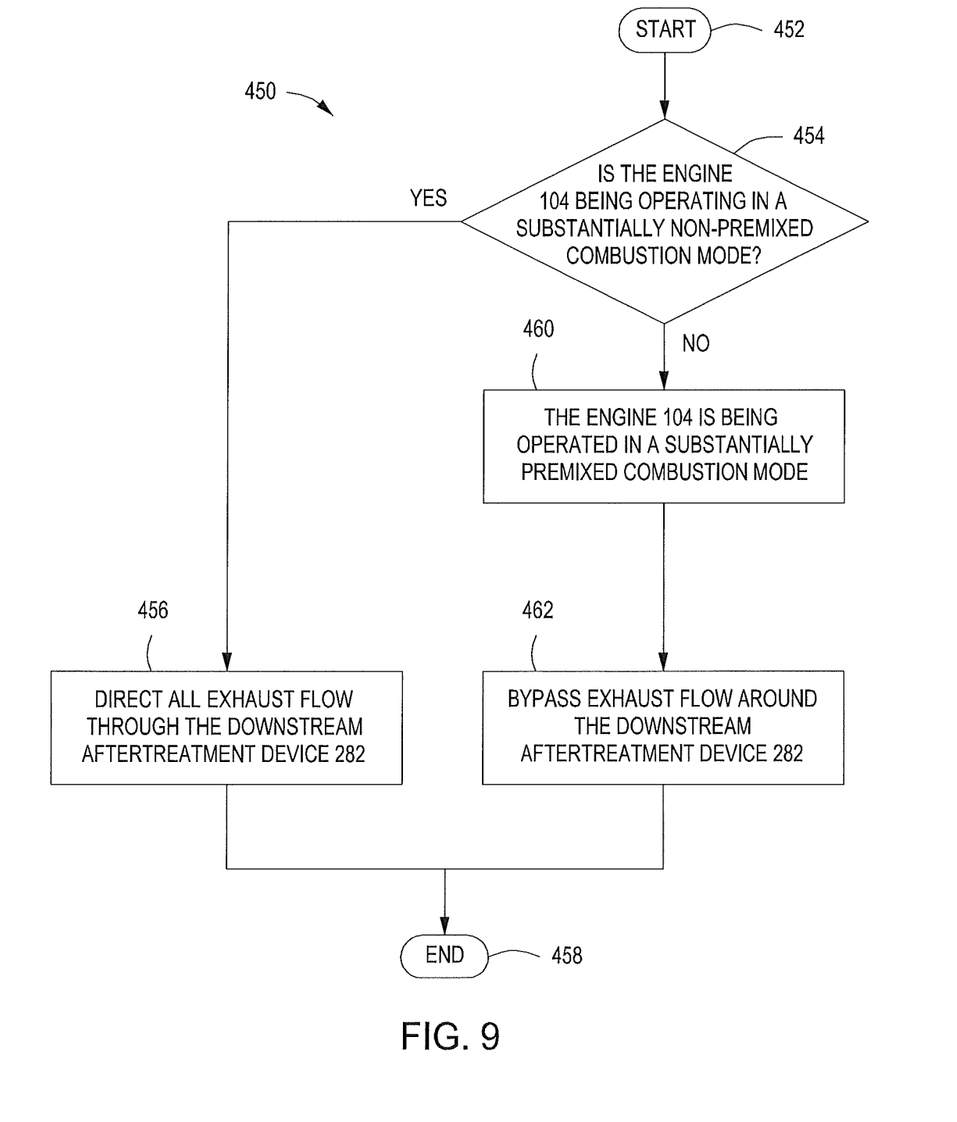
FIG. 9 shows a method for operating an exhaust aftertreatment system, according to an aspect of the disclosure.

FIG. 9 shows a method 450 for operating an exhaust aftertreatment system 220, according to an aspect of the disclosure. Following the start 452 the method 450 determines in step whether the engine 104 is being operated in a substantially non-premixed combustion mode. As discussed previously, non-limiting examples of a non-premixed combustion mode include conventional direct-injection compression ignition and conventional diesel operation.

If the engine 104 is operating in a substantially non-premixed combustion mode, then substantially all exhaust flow from the engine 104 is directed through the downstream aftertreatment device 282 in step 456. Substantially all of the exhaust flow from the engine 104 may be directed through the downstream aftertreatment device 282 by configuring the exhaust valve assembly 284 to effect fluid communication between the first port 286 and the second port 288, and block fluid communication between the first port 286 and the third port 290, for example. It will be appreciated that according to method 450, substantially all of the exhaust flow from the engine 104 is directed through the downstream aftertreatment device 282 when the engine 104 operating in a substantially non-premixed combustion mode, independent of whether the downstream aftertreatment device 282 is being regenerated.

If the IC engine 104 is not operating in a substantially non-premixed combustion mode, then the method 450 determines that the IC engine 104 is operating in a substantially premixed combustion mode in step 460, and substantially all exhaust flow from the engine 104 is bypassed around the downstream aftertreatment device 282 in step 462. Substantially all of the exhaust flow from the engine 104 may be bypassed around the downstream aftertreatment device 282 by configuring the exhaust valve assembly 284 to block fluid communication between the first port 286 and the second port 288, and effect fluid communication between the first port 286 and the third port 290. It will be appreciated that according to method 450, substantially all of the exhaust flow from the engine 104 is bypassed around the downstream aftertreatment device 282 when the engine 104 operating in a substantially premixed combustion mode, independent of whether the downstream aftertreatment device 282 is being regenerated. As discussed previously, non-limiting examples of a premixed combustion mode include HCCI and piloted-HCCI. The method 450 ends at the step 458, where the method may repeat or another control procedure may be invoked.

Figure 10:
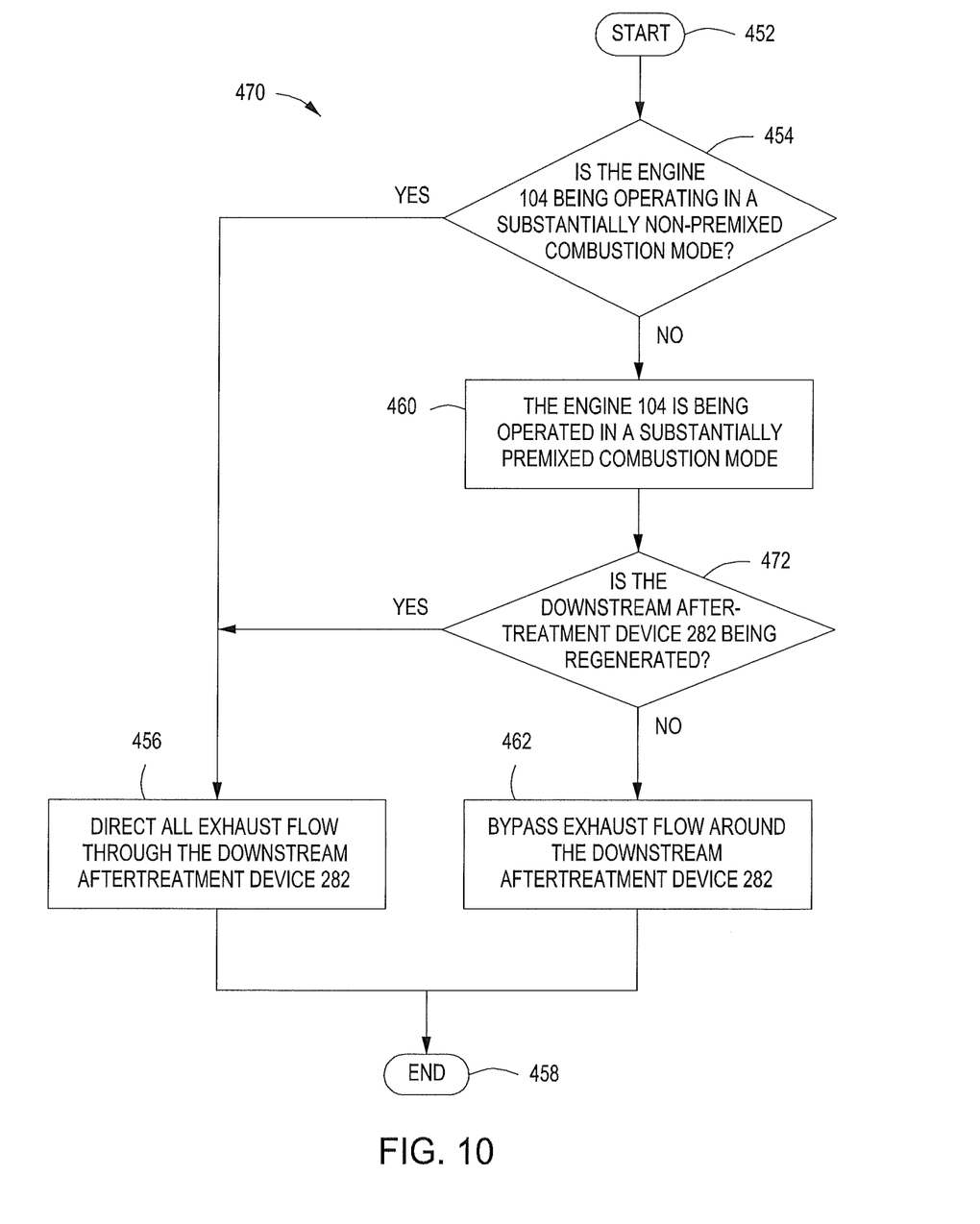
FIG. 10 shows a method for operating an exhaust aftertreatment system, according to an aspect of the disclosure.

FIG. 10 shows a method 470 for operating an exhaust aftertreatment system 220, according to an aspect of the disclosure. If the IC engine 104 is operating in a substantially premixed combustion mode, then the method 470 determines whether the downstream aftertreatment device 282 is being regenerated in step 472. If the downstream aftertreatment device 282 is being regenerated, then method 470 continues to step 456, where substantially all of the exhaust flow from the IC engine 104 is directed through the downstream aftertreatment device 282. If the downstream aftertreatment device is not being regenerated, then method 470 continues to step 462 where substantially all of the exhaust flow from the IC engine 104 is bypassed around the downstream aftertreatment device 282.

Figure 11:
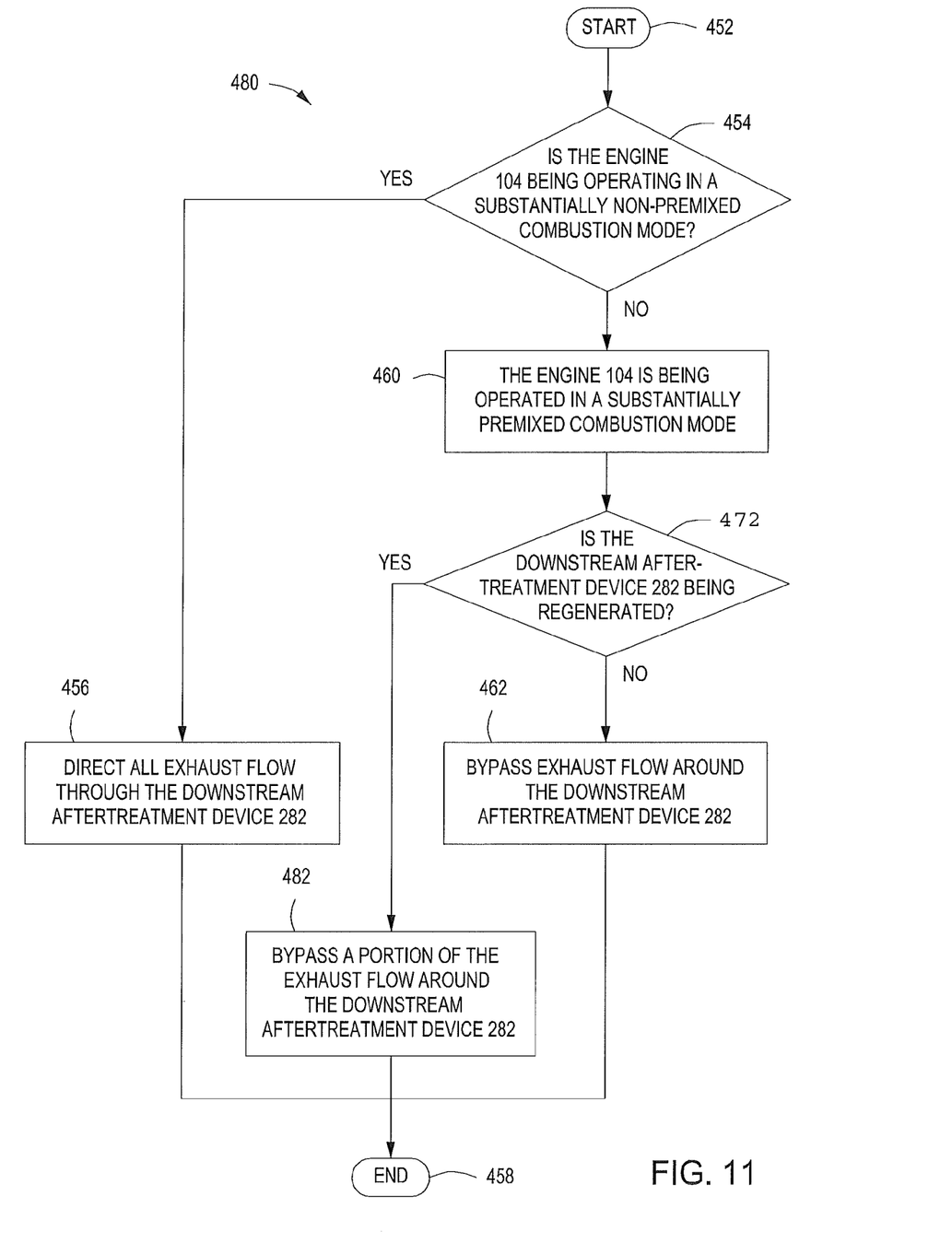
FIG. 11 shows a method for operating an exhaust aftertreatment system, according to an aspect of the disclosure.

FIG. 11 shows a method 480 for operating an exhaust aftertreatment system 220, according to an aspect of the disclosure. If the IC engine 104 is operating in a substantially premixed combustion mode and the downstream aftertreatment device 282 is being regenerated, then the method 480 continues to step 482, where a portion of the exhaust flow from the IC engine 104 is bypassed around the downstream aftertreatment device 282. A portion of the exhaust flow from the IC engine 104 may be bypassed around the downstream aftertreatment device 282 by configuring the exhaust valve assembly 284 to proportionally split a flow of exhaust entering the first port 286 of the exhaust valve assembly 284 between the second port 288 and the third port 290 of the exhaust valve assembly 284.

Bypassing the downstream aftertreatment device 282 when the IC engine is operating in a substantially premixed combustion mode, such as HCCI or piloted-HCCI, for example, may benefit fuel consumption of the IC engine 104, life of the downstream aftertreatment device 282, or both. Indeed, the overall flow passage through the downstream aftertreatment device 282 may have a smaller effective flow area, and in turn, a higher pressure drop characteristic, than the exhaust duct 216, especially when the downstream aftertreatment device 282 includes a NOx catalyst, such as a NOx adsorber, disposed on a honeycomb or other high surface area-to-volume substrate known in the art. In turn, bypassing the downstream aftertreatment device 282 when its aftertreatment function is not required may save fuel by decreasing backpressure on the IC engine 104 exhaust. In addition, bypassing the downstream aftertreatment device 282 when its function is not required, may promote longer life of the downstream aftertreatment device 282 by decreasing its duty cycle.

Aspects of the disclosure provide the advantages of a wide operating range for a dual combustion mode IC engine 104 without the need for a PM filter during any operating condition. Accordingly, aspects of the disclosure help to reduce the size and cost of an exhaust aftertreatment system 220 for a dual combustion mode IC engine 104, in addition to further reducing engine backpressure that may result from conventional approaches that use a PM filter.

By incorporating the regeneration module 320, which is capable of synthesizing a reducing agent or reductant from the fuel supply system 250, the logistics of supplying a reductant not synthesized from fuel, such as urea, for example, are simplified. Furthermore, by implementing a NOx adsorber in the downstream aftertreatment device 282, instead of an SCR catalyst which is regenerated using an ammonia reductant, for example, issues with NOx sensor 380, 382 cross-sensitivity to ammonia is reduced or avoided. Moreover, avoiding urea and/or ammonia as a reductant may beneficially obviate the need for an ammonia oxidation catalyst in the downstream aftertreatment device 282, thereby further reducing the size and cost of the exhaust aftertreatment system 220.

In addition, aspects of the disclosure enable an operator to uncouple the regeneration of the downstream aftertreatment device 282 from the engine 104 operating mode. Indeed, the apparatus and methods described herein provide for regeneration of the aftertreatment device 282 without having to tailor engine 104 operation to needs of a regeneration process. Instead, the operational flexibility provided by the exhaust valve assembly 284 and the regeneration module 320, for example, allow an operator to tailor operating conditions of the engine 104 to promote other performance metrics, such as, fuel economy, power, and responsiveness, for example.

It will be appreciated that any of the methods or functions described herein may be performed by or controlled by the controller 150. Further, any of the methods or functions described herein may be embodied in a computer-readable non-transitory medium for causing the controller 150 to perform the methods or functions described herein. Such computer-readable non-transitory media may include magnetic disks, optical discs, solid state disk drives, combinations thereof, or any other computer-readable non-transitory medium known in the art. Moreover, it will be appreciated that the methods and functions described herein may be incorporated into larger control schemes for an engine, a hybrid powertrain, a machine, or combinations thereof, including other methods and functions not described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Unless specified otherwise, use of the word "substantially" herein is intended to mean "considerable in extent," or "largely but not necessarily wholly that which is specified."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An exhaust aftertreatment system for an engine, comprising:
    an exhaust valve assembly having a first port, a second port, and a third port, the exhaust valve assembly being configured to effect selective fluid communication between the first port, the second port, and the third port;
    an exhaust conduit fluidly coupled to an exhaust port of the engine and fluidly coupled to the first port of the exhaust valve assembly;
    an exhaust aftertreatment device fluidly coupled to the second port of the exhaust valve assembly;
    a bypass conduit fluidly coupled to the third port of the exhaust valve assembly, the bypass conduit configured to bypass a flow of exhaust around the exhaust aftertreatment device;
    a reductant supply in selective fluid communication with the exhaust conduit; and
    a controller operatively coupled to the exhaust valve assembly, the reductant supply, and the engine, the controller being configured to regenerate the exhaust aftertreatment device according to a first regeneration procedure when the engine operates in a substantially non-premixed mode, the first regeneration procedure including
        delivering a first flow of reductant from the reductant supply to the exhaust aftertreatment device, effecting fluid communication between the first port and the second port, and blocking fluid communication between the first port and the third port.

2. The exhaust aftertreatment system of claim 1, wherein the substantially non-premixed mode is a conventional direct-injection compression ignition mode.

3. The exhaust aftertreatment system of claim 1, wherein the controller is further configured to block fluid communication between the first port and the second port, and effect fluid communication between the first port and the third port when the engine operates in a substantially premixed mode and the exhaust aftertreatment device is not being regenerated.

4. The exhaust aftertreatment system of claim 3, wherein the substantially premixed mode is one of a homogeneous charge compression ignition (HCCI) mode and a piloted-HCCI mode.

5. The exhaust aftertreatment system of claim 3, wherein the exhaust conduit includes an oxidation catalyst, the exhaust port of the engine being in fluid communication with the first port of the exhaust valve assembly via the oxidation catalyst.

6. The exhaust aftertreatment system of claim 5, wherein the controller is further configured to regenerate the exhaust aftertreatment device according to a second regeneration procedure when the engine operates in the substantially premixed mode, the second regeneration procedure including delivering a second flow of reductant from the reductant supply to the exhaust aftertreatment device, effecting fluid communication between the first port and the third port, and effecting fluid communication between the first port and the second port, such that at least a portion of exhaust flow from the engine flows through the exhaust aftertreatment device.

7. The exhaust aftertreatment system of claim 5, wherein the controller is further configured to regenerate the exhaust aftertreatment device according to a second regeneration procedure when the engine operates in the substantially premixed mode, the second regeneration procedure including delivering a second flow of reductant from the reductant supply to the exhaust aftertreatment device, effecting fluid communication between the first port and the third port, and blocking fluid communication between the first port and the second port.

8. The exhaust aftertreatment system of claim 5, wherein the controller is further configured to regenerate the exhaust aftertreatment device according to the first regeneration procedure when the engine operates in the substantially premixed mode.

9. The exhaust aftertreatment system of claim 3, wherein the substantially premixed mode is mainly fueled by a gaseous fuel, and the substantially non-premixed mode is mainly fueled by a liquid fuel.

10. The exhaust aftertreatment system of claim 3, wherein the substantially premixed mode and the substantially non-premixed mode are both mainly fueled by a liquid fuel.

11. The exhaust aftertreatment system of claim 1, wherein the controller is further configured to effect fluid communication between the first port and the second port, and block fluid communication between the first port and the third port when the engine operates in the substantially non-premixed mode and the exhaust aftertreatment device is not being regenerated.

12. The exhaust aftertreatment system of claim 1, wherein the exhaust aftertreatment system does not include a particulate filter.

13. The exhaust aftertreatment system of claim 1, wherein the exhaust aftertreatment device includes a selective catalytic reduction catalyst configured to reduce NOx into nitrogen.

14. The exhaust aftertreatment system of claim 1, wherein the exhaust aftertreatment device is a NOx adsorber.

15. The exhaust aftertreatment system of claim 14, wherein the reductant supply is in further fluid communication with a source of gaseous fuel, and the reductant supply is configured to convert at least a portion of gaseous fuel from the source of gaseous fuel into hydrogen for reducing NOx stored in the NOx adsorber.

16. A method for operating an exhaust gas aftertreatment system for an engine, the exhaust gas aftertreatment system including:

an exhaust valve assembly having a first port, a second port, and a third port, the exhaust valve assembly being configured to effect selective fluid communication between the first port, the second port, and the third port, an exhaust conduit fluidly coupled to an exhaust port of the engine and fluidly coupled to the first port of the exhaust valve assembly, an exhaust aftertreatment device fluidly coupled to the second port of the exhaust valve assembly, a bypass conduit fluidly coupled to the third port of the exhaust valve assembly, the bypass conduit configured to bypass a flow of exhaust around the exhaust aftertreatment device; and a reductant supply in selective fluid communication with the exhaust conduit, the method comprising:

receiving a flow of exhaust gas at the first port of an exhaust valve assembly;

operating the engine in a substantially non-premixed mode; and regenerating the exhaust aftertreatment device while the engine operates in the substantially non-premixed mode according to a first regeneration procedure, including delivering a flow of reductant from the reductant supply to the exhaust aftertreatment device, effecting fluid communication between the first port and the second port, and blocking fluid communication between the first port and the third port.

17. An exhaust aftertreatment system, comprising:

a first housing;

a second housing in fluid communication with the first housing via a crossover duct;

an upstream aftertreatment device disposed in the first housing;

an exhaust valve assembly disposed downstream of the upstream aftertreatment device and upstream of the crossover duct in a direction of exhaust flow through the exhaust aftertreatment system;

a downstream aftertreatment device disposed in the second housing; and a bypass duct in fluid communication with the exhaust valve assembly and an outlet of the second housing, wherein:

the exhaust valve assembly includes a first port, a second port, and a third port, the first port is fluidly coupled with an outlet of the upstream aftertreatment device, the second port is fluidly coupled with the second housing via the crossover duct, a first configuration of the exhaust valve assembly effects fluid communication between the first port and the second port, and blocks fluid communication between the first port and the third port, and a second configuration of the exhaust valve assembly blocks fluid communication between the first port and the second port, and effects fluid communication between the first port and the third port.

18. The exhaust aftertreatment system of claim 17, wherein the upstream aftertreatment device includes an oxidation catalyst.

19. The exhaust aftertreatment system of claim 18, wherein the downstream aftertreatment device includes a NOx adsorber.

20. The exhaust aftertreatment system of claim 17, wherein the upstream aftertreatment device consists of an oxidation catalyst and the downstream aftertreatment device consists of a NOx adsorber.

* * * * *